United States Patent [19]

Eisele et al.

[11] 4,239,735

[45] Dec. 16, 1980

[54] REMOVAL OF IMPURITES FROM CLAY

[75] Inventors: Judith A. Eisele, Verdi; Donald J. Bauer; Paul R. Bremner, both of Reno, all of Nev.

[73] Assignee: The United States of America, as represented by the Secretary of the Interior, Washington, D.C.

[21] Appl. No.: 72,957

[22] Filed: Sep. 6, 1979

[51] Int. Cl.$^3$ .............................................. C01F 7/22
[52] U.S. Cl. .................................... 423/126; 423/132
[58] Field of Search ................................ 423/126, 132

[56] References Cited

U.S. PATENT DOCUMENTS

| | | | |
|---|---|---|---|
| 558,725 | 4/1896 | Gooch | 423/126 |
| 1,490,021 | 4/1924 | Pedemonte | 423/132 |
| 1,777,570 | 10/1930 | Masin | 423/132 |
| 1,798,261 | 3/1931 | Hoisfield | 423/132 |
| 2,413,709 | 1/1947 | Hoffman | 423/126 |
| 3,816,605 | 6/1974 | Belsky | 423/132 |

*Primary Examiner*—Herbert T. Carter

*Attorney, Agent, or Firm*—William S. Brown; Donald A. Gardiner

[57] ABSTRACT

A method for producing substantially pure alumina from kaolin clay by removing in a soluble form impurities which contaminate the alumina while the aluminum is maintained in an insoluble form. This is accomplished by leaching calcined kaolin clay with at least 36 weight percent hydrochloric acid to dissolve the impurities and convert the aluminum to insoluble aluminum chloride and maintaining the hydrochloric acid concentration in the leach liquor at at least 36 weight percent by the injection of hydrochloric acid gas. The insoluble aluminum chloride is then separated from the dissolved impurities and subjected to a second leaching step to solubilize and separate it from the silica gangue. Substantially pure $AlCl_3 \cdot 6H_2O$ crystals are recovered from solution and converted to alumina by conventional means. In an alternate embodiment, the process may be practiced on uncalcined clay and includes the addition of a source of fluoride ions, such as $H_2SiF_6$, to the at least 36 weight percent hydrochloric acid leach liquor. An optional preleaching step utilizing 2N to 6N mineral acid is also disclosed.

18 Claims, No Drawings

REMOVAL OF IMPURITES FROM CLAY

DESCRIPTION

Technical Field

The present invention relates generally to the separation and recovery of substantially pure alumina from aluminiferous materials and, specifically, to a method for the removal of impurities which contaminate alumina recovered from kaolin clay.

Background Art

In recent years an increasing emphasis has been placed on the utilization of domestic resources for the production of aluminum in an attempt to reduce this country's dependence on imported bauxite ore. Some domestic clay resources have been found to be valuable sources of this important metal. In particular, cell-grade alumina can be produced from domestic kaolin clay deposits. However, other substances found in the kaolin clay tend to contaminate the alumina and are not readily separated from it using currently available processes.

The leaching of kaolin clay with hydrochloric acid to recover the aluminum in the clay as $AlCl_3.6H_2O$ is well known, as is the use of hydrochloric acid gas to precipitate aluminum chloride from water suspensions of calcined clay. See, e.g. U.S. Pat. Nos. 1,519,880; 2,189,376; and 2,217,099. Alumina is recoverable from the aluminum chloride by conventional techniques, such as thermal decomposition and the like. However, difficult to remove impurities such as $P_2O_5$, MgO, $K_2O$, CaO and $Fe_2O_3$ are also leached from the clay and prevent the ultimate recovery of pure alumina. While iron, which is likely to be the major contaminant, is readily removed from the leach liquor by solvent extraction or other conventional means, and potassium can be removed by controlling the acidity of the leach liquor, other contaminants, such as CaO, MgO and $P_2O_5$, present more complicated and expensive removal problems. These problems are compounded somewhat by the repeated recycling of the leach liquor which commonly occurs during presently known continuous aluminum extraction processes such as those disclosed in the aforementioned U.S. Patents. Such recycling tends to concentrate impurities to levels which seriously contaminate the alumina. Furthermore, prior art processes for the production of alumina from clay present additional disadvantages, such as lengthy processing times, involved processing steps and excessive energy consumption.

DISCLOSURE OF THE INVENTION

Accordingly, it is an object of the present invention to provide a hydrochloric acid leaching method whereby the impurities which contaminate alumina may be removed from kaolin clay quickly, effectively and inexpensively to produce substantially pure alumina.

It is an additional object of the present invention to provide a method of removing the impurities from kaolin clay prior to solubilization of the aluminum in the clay.

Other objects and advantages will become apparent from the following description and appended claims.

Briefly stated, in accordance with the aforesaid objects, a method for producing substantially pure alumina from aluminiferous raw materials, such as calcined kaolin clay, is provided whereby alumina contaminants, such as $P_2O_5$, MgO, CaO, $K_2O$ and $Fe_2O_3$, are removed from kaolin clay as soluble matter before the aluminum in the clay is solubilized. As a result the level of impurities in the liquor from which $AlCl_3.6H_2O$ is crystallized is greatly reduced. The method of the present invention comprises the steps of leaching calcined kaolin clay with hydrochloric acid maintained at a concentration of not less than 36 weight percent and a temperature of about 50° to 110° C., preferably about 90° to 95° C., to form a leach solution containing insoluble matter. So long as the concentration of hydrochloric acid is maintained at at least 36%, such as by the injection of hydrochloric acid gas, the $AlCl_3.6H_2O$ solubility is depressed and it remains in insoluble form while the impurities remain soluble at the high acid concentration and can be readily separated from the insoluble $AlCl_3.6H_2O$ by filtering and washing the filter cake with 36% hydrochloric acid. The insoluble aluminum chloride in the filter cake may be solubilized in conventional manner, such as by dissolving in water or in 26 weight percent HCl solution.

BEST MODE FOR CARRYING OUT THE INVENTION

The preferred method of the present invention comprises leaching calcined kaolin clay with 36 weight percent hydrochloric acid at a temperature of about 50° to 110° C., preferably 90° to 95° C., during or after which time hydrochloric acid gas is injected into the leach solution to maintain a constant hydrochloric acid concentration of at least 36 weight percent; cooling the resulting leach solution, which contains unreacted clay solids and insoluble aluminum chloride, to room temperature; filtering the solution and washing the filter cake with 36 weight percent hydrochloric acid to remove substantially all of the impurities as soluble materials while maintaining the aluminum chloride in insoluble form; further contacting the filter cake with water or about 26 weight percent hydrochloric acid to solubilize the aluminum chloride content thereof; filtering the resulting aluminum chloride solution; and sparging the solution with hydrochloric acid gas to recover substantially pure $AlCl_3.6H_2O$ crystals.

The method of the present invention removes the major portion of the impurities from the clay prior to the solubilization of the aluminum and thus increases the purity of the alumina ultimately recovered from the clay. Contamination of the aluminum by impurities such as $P_2O_5$, MgO, $K_2O$, CaO and $Fe_2O_3$ is substantially avoided in the practice of the present process by the utilization of at least 36 weight percent hydrochloric acid to leach the calcined kaolin clay. At this concentration, the impurities are soluble, while the solubility of the aluminum is depressed. In fact, $AlCl_3.6H_2O$ is virtually insoluble in 36% hydrochloric acid. At lower hydrochloric acid concentrations, however, the solubility of the aluminum increases, as does the likelihood that substantial amounts of aluminum could be lost when the impurities, which are also soluble at lower concentrations, are removed. Therefore, to insure the recovery of the maximum amount of aluminum possible from the clay, it is important that the hydrochloric acid concentration be maintained.

The starting material for the method of the present invention is kaolin clay which has been calcined by conventional means known to those skilled in the art. An alternate embodiment of the process, discussed hereinbelow, allows conservation of the energy required to calcine the clay and therefore permits the use of an untreated kaolin clay starting material.

In the preferred process, the calcined kaolin clay is placed in a leaching vessel to which is added a solution of at least 36 weight percent hydrochloric acid. At least 100 ml to 500 ml, and preferably at least 150 ml, of 36% hydrochloric acid is required to leach the impurities from each 50 g of clay. Since the reaction between the calcined kaolin clay and the hydrochloric acid generates water, it is necessary to inject hydrochloric acid gas to maintain the acid concentration at at least 36 weight percent. Injection of the hydrochloric acid gas into the leach solution typically occurs during the leaching process and may be continued afterwards to insure the required acidity of the solution. In the preferred embodiment of the process, heat is applied to the leaching vessel to bring the temperature to about 50° to 110° C. and preferably to about 90° to 95° C. Although the reaction between the hydrochloric acid and the clay generates heat and is self sustaining, the reaction proceeds too slowly for practical commercial purposes unless heat is applied. The calcined clay is leached with 36 weight percent hydrochloric acid for about 15 minutes to 4 hours, preferably 1 to 2 hours, during which time hydrochloric acid gas is injected to maintain the HCl concentration at at least 36 weight percent.

The resulting reaction mixture, which consists of leach solution and solid $AlCl_3.6H_2O$ and silica tails, is then preferably cooled to room temperature. The continued injection of hydrochloric acid gas during cooling insures that the concentration will be maintained at at least 36% so that little or no aluminum will dissolve in the cooling leach liquor. The cooled reaction mixture is then filtered and the filter cake washed with 36 weight percent hydrochloric acid to wash out substantially all of the soluble impurities, which include $P_2O_5$, $Fe_2O_3$, $K_2O$, MgO and CaO. The filtrate and wash solution contain more than 86% to 94% of the impurities in the clay which most commonly contaminate alumina while only a minor amount of the aluminum, about 1% to 2%, is found therein.

The substantially uncontaminated $AlCl_3.6H_2O$ in the filter cake is then solubilized by conventional means to separate it from the silica gangue portion thereof. A preferred process includes contacting the filter cake with sufficient water for a period of about 15 minutes to 4 hours, preferably 1 to 2 hours, to dissolve the $AlCl_3.6H_2O$. The application of heat is not required; however, it may be desired to apply sufficient heat to decrease the viscosity of the resulting solution. This may be accomplished, for example, by contacting the filter cake with elevated temperature water at about 25° to 100° C. Alternatively, the filter cake may be contacted with a solution of 26% hydrochloric acid to render the aluminum chloride soluble. In this case enough heat must be applied to the aluminum chloride-hydrochloric acid solution to drive off the hydrochloric acid content, at which point the solubility of the aluminum chloride will be enhanced. It has been found that solubilizing the aluminum with 26% hydrochloric acid is most effective when the aluminum chloride-hydrochloric acid solution is maintained at about 95° C. for about 2 hours.

The resulting solution containing the dissolved aluminum chloride is separated from the insoluble silica gangue by filtering and subsequently washing the filter cake with water. This $AlCl_3$ solution is substantially pure, containing only a minor amount, about 6% to 12%, of the $P_2O_5$, MgO, $K_2O$, CaO and $Fe_2O_3$ impurities originally present in the clay and typically containing more than 90% of the aluminum originally present. Sparging the $AlCl_3$ solution with hydrochloric acid gas results in the recovery of the aluminum chloride as substantially pure $AlCl_3.6H_2O$ crystals. It is possible to recycle the liquor from this step for use in the prior step of solubilizing aluminum chloride to separate it from the silica tails.

The energy required to calcine the clay can be saved by utilizing an alternate embodiment of the present process. In this embodiment raw, uncalcined kaolin clay is leached with hydrochloric acid maintained at a concentration of at least 36 weight percent by the injection of hydrochloric acid gas, as in the first step of the preferred embodiment, to which has been added $H_2SiF_6$ or any other appropriate source of fluoride ions, such as $CaF_2$, $Na_2SiF_6$ or HF. The reaction of the clay with the hydrochloric acid in the presence of fluoride ions generates more heat than the reaction conducted in the absence of fluoride ions and, therefore, the external application of heat to the leaching vessel is not as beneficial in the preferred embodiment. A $H_2SiF_6$ concentration of about 0.05 to 1.0, preferably 0.2, moles F ion per mole of aluminum in the kaolin clay sample has been found to effectively assist in the removal of impurities from uncalcined clay prior to the solubilization of the aluminum. As in the preferred process, the impurities are soluble in the strong acid, but the aluminum remains insoluble.

In some cases it may be desirable to remove certain of the impurities prior to performing the at least 36% hydrochloric acid leach process of the preferred embodiment. If it is desired to perform this preleaching step, raw uncalcined kaolin clay is contacted with a dilute mineral acid, the resulting solids are filtered, washed and contacted with a solution of about 26 weight percent hydrochloric acid and $H_2SiF_6$ (or other source of fluoride ions, e.g., $CaF_2$, $Na_2SiF_6$, HF). Dilute mineral acid concentrations of about 2 N have been found to remove more than 30% of the $P_2O_5$ and MgO from the clay while removing only about 5% of the aluminum. A preleach mineral acid concentration of about 6 N will remove about 50% of these impurities; however, this concentration also leaches about 14% of the aluminum with the impurities. Although hydrochloric acid is preferred for use in the dilute mineral acid preleach, other mineral acids, such as nitric acid and sulfuric acid, are also suitable.

The following Examples are intended to be illustrative of the present invention and are not intended to limit its scope in any way.

EXAMPLE I 50 g of calcined kaolin clay was leached with 150 ml of 36 weight percent HCl for 2 hours at 90° C., during which time HCl gas was injected into the leach solution to maintain the concentration of the HCl at 36%. The resulting solids containing leach solution was then cooled to room temperature while the injection of HCl gas was continued to insure saturation of the solution. After cooling, the solution was filtered and the filter cake washed with 36% HCl. The filtrate and wash solutions were collected and labelled "Strong Acid". The remaining filter cake was leached with 200 ml of hot water for 1 hour, the resulting solution and solids filtered and the filter cake washed with water. The water leach and wash solutions were collected and labelled "Water". The filter cake constituted the "Residue". Analysis of the "Strong Acid" and "Water" solutions and the dried residue yielded the following results:

|  | Percent Elements in Leaches | | | | | |
|---|---|---|---|---|---|---|
|  | Al | $P_2O_5$ | $Fe_2O_3$ | $K_2O$ | MgO | CaO |
| Strong Acid | 1.3 | 86 | 88 | 91 | 94 | 94 |
| Water | 97 | 14 | 12 | 9 | 6 | 6 |
| Residue | 1.5 | | | | | |

EXAMPLE II 50 g of calcined clay was leached with 150 ml of 36 weight percent HCl and 20 ml of 30 percent $H_2SiF_6$ for 4 hours. No heat was applied; however, the heat generated by the reaction caused the temperature to rise to 78° C. HCl gas was injected during the leach period but was discontinued while the solids containing leach solution cooled back to room temperature. As a result, the final HCl concentration in the leach liquor was less than 36%. The solution was filtered and the filter cake washed with 36% HCl. The filtrate and wash solutions were collected and labelled "Strong Acid". The remaining filter cake was leached with 150 ml of 26% HCl at 95° C. for 2 hours. The resulting solution and solids were filtered and the filter cake washed with water. The 26% HCl leach and water wash solutions were collected and labelled "Weak Acid". The filter cake constituted the "Residue". Analysis of the "Strong Acid" and "Weak Acid" solution and the "Residue" yielded the results set forth below. Titration of the second leach solution showed that it contained 7% free HCl.

|  | Percent Elements in Leaches | | | | | |
|---|---|---|---|---|---|---|
|  | Al | $P_2O_5$ | $Fe_2O_3$ | $K_2O$ | MgO | CaO |
| Strong Acid | 7 | 92 | 97 | 88 | 94 | 94 |
| Weak Acid | 91 | 8 | 3 | 12 | 6 | 6 |
| Residue | 2 | | | | | |

EXAMPLE III 50 g of raw kaolin was leached with 150 ml of 36 weight percent HCl and 20 ml of 30% $H_2SiF_6$ for 2 hours at 95° C. HCl gas was injected into the solids containing leach solution during leaching, cooling and after cooling to room temperature to insure saturation with HCl. The solution was then filtered and the filter cake washed with 36% HCl. The filtrate and wash solutions were collected and labelled "Strong Acid". The remaining filter cake was leached with 200 ml hot water for 1 hour. The resulting solution and solids were filtered and the filter cake washed with water. The water leach and wash solutions were collected and labelled "Water". The filter cake constituted the "Residue". The "Strong Acid", "Water" and "Residue" were analyzed, as in Examples I and II, and yielded the results set forth below.

|  | Percent Elements in Leaches | | | | | |
|---|---|---|---|---|---|---|
|  | Al | $P_2O_5$ | $Fe_2O_3$ | $K_2O$ | MgO | CaO |
| Strong Acid | 2 | 94 | 98 | 91 | 91 | 85 |
| Water | 91 | 6 | 2 | 9 | 9 | 15 |
| Residue | 7 | | | | | |

The optional preleaching step is illustrated by the following examples.

EXAMPLE IV 50 g of uncalcined kaolin clay was leached with 150 ml of 2 N HCl for 2 hours at the boiling point. The resulting solids containing leach solution was filtered and the filter cake washed. The filtrate and wash solution constituting the preleach, were collected and analyzed. The filter cake was then subjected to a leaching process as described above to remove the remaining impurities and solubilize the aluminum. Analysis of the preleach filtrate and wash solution showed the following percentages of impurities and aluminum removed during preleaching:

$P_2O_5$—31%
MgO—35%
$K_2O$—10%
$Fe_2O_3$—10%
Al—5%

The use of 2 N $HNO_3$ and 2 N $H_2SO_4$ yielded similar results.

EXAMPLE V 50 g of uncalcined kaolin clay was leached as in Example IV except that 150 ml of 6 N HCl was used. Analysis of the preleach filtrate and wash solution showed the following percentages of impurities and aluminum removed during preleaching:

$P_2O_5$—57%
MgO—49%
$K_2O$—8%
$Fe_2O_3$—15%
Al—14%

We claim:

1. A method for producing substantially pure alumina from aluminum-containing calcined kaolin clay, comprising the steps of:
   (a) contacting the calcined clay with a solution comprising at least 36 weight percent hydrochloric acid, whereby said acid reacts with said clay to form soluble and insoluble reaction products, said insoluble products containing a major proportion of the aluminum content of said clay;
   (b) maintaining said concentration of hydrochloric acid at at least 36 weight percent;
   (c) separating the solids portion of the clay-reaction product-acid mixture from the liquid portion;
   (d) washing said solids portion with a solution having a concentration of at least 36 weight percent hydrochloric acid;
   (e) solubilizing the aluminum contained in said solids portion by contacting with water having a temperature of about 25° to 100° C., or with a solution comprising about 26 weight percent hydrochloric acid and applying sufficient heat to drive off the hydrochloric acid content of the resulting solution, to separate it from the remainder thereof;
   (f) precipitating said aluminum as substantially uncontaminated crystals of $AlCl_3.6H_2O$; and (g) converting said crystals of AlCl$_3$.6H$_2$O to alumina.

2. A method as claimed in claim 1 wherein said clay-hydrochloric acid reaction mixture is heated to a temperature in the range from about 50° to 110° C.

3. A method as claimed in claim 1 wherein said clay-hydrochloric acid reaction mixture is heated to a temperature in the range from about 90° to 95° C.

4. A method as claimed in claims 1 or 2 wherein said at least 36 weight percent hydrochloric acid concentration is maintained for a period of about 15 minutes to 4 hours.

5. A method as claimed in claims 1 or 2 wherein said at least 36 weight percent hydrochloric acid concentration is maintained for a period of about 1 to 2 hours.

6. A method, as claimed in claim 1, wherein said solids portion is separated from said liquid portion by filtering.

7. A method, as claimed in claim 1, wherein said aluminum chloride crystals are precipitated by sparging said aqueous aluminum chloride solution with hydrochloric acid gas.

8. A method for producing substantially pure alumina from aluminum-containing uncalcined kaolin clay, comprising the steps of:
  (a) contacting the uncalcined clay with a solution comprising at least 36 weight percent hydrochloric acid and a source of fluoride ions, whereby said acid reacts with said clay to form soluble and insoluble reaction products, said insoluble products containing a major proportion of the aluminum content of said clay;
  (b) maintaining said concentration of hydrochloric acid at at least 36 weight percent;
  (c) separating the solids portion of the clay-reaction product-acid mixture from the liquid portion;
  (d) washing said solids portion with at least 36 weight percent hydrochloric acid;
  (e) solubilizing the aluminum contained in said solids portion by contacting with water having a temperature of about 25° to 100° C., or with a solution comprising about 26 weight percent hydrochloric acid and applying sufficient heat to drive off the hydrochloric acid content of the resulting solution, to separate it from the remainder thereof;
  (f) precipitating said aluminum as substantially uncontaminated crystals of AlCl$_3$.6H$_2$O; and
  (g) converting said crystals of AlCl$_3$.6H$_2$O to alumina.

9. A method, as claimed in claim 8, wherein said source of fluoride ions is selected from the group consisting of H$_2$SiF$_6$, CaF$_2$, HF and Na$_2$SiF$_6$.

10. A method, as claimed in claim 8, wherein said source of fluoride ions is H$_2$SiF$_6$.

11. A method, as claimed in claim 8, including the step of maintaining said clay-hydrochloric acid reaction mixture at a temperature in the range from about 50° to 110° C.

12. A method, as claimed in claims 8 or 9, wherein said at least 36 weight percent hydrochloric acid concentration is maintained for a period of about 15 minutes to 4 hours.

13. A method, as claimed in claims 8 or 9, wherein said at least 36 weight percent hydrochloric acid concentration is maintained for a period of about 1 to 2 hours.

14. A method, as claimed in claim 8, wherein said solids portion is separated from said liquid portion by filtering.

15. A method, as claimed in claim 8, wherein said aluminum chloride crystals are precipitated by sparging said aqueous aluminum chloride solution with hydrochloric acid gas.

16. A method as claimed in claims 8 or 9, further including the steps of contacting said uncalcined clay prior to step (a) with a solution of a dilute mineral acid for a period of about 1 to 2 hours while maintaining said solution at its boiling point to form liquid and solid portions, said liquid portion containing alumina contaminating impurities and said solid portion containing a major portion of the aluminum content of said clay and separating the liquid and solid portions.

17. A method as claimed in claim 16, wherein said acid is selected from the group consisting of HCl, HNO$_3$ and H$_2$SO$_4$.

18. A method as claimed in claim 17, wherein the concentration of said acid is in the range from 2 N to 6 N.

* * * * *